Oct. 14, 1969 F. S. GUTLEBER ETAL 3,472,960

SYNCHRONIZING SYSTEM HAVING LOCALLY GENERATED SIGNALS AND PSK INFORMATION SIGNALS

Filed Nov. 30, 1966 2 Sheets-Sheet 1

INVENTORS.
FRANK S. GUTLEBER
IRVING A. KRAUSE

Alfred C. Hill
AGENT

INVENTORS.
FRANK S. GUTLEBER
IRVING A. KRUSE
Alfred C. Hill
AGENT 3,472,960

SYNCHRONIZING SYSTEM HAVING LOCALLY GENERATED SIGNALS AND PSK INFORMATION SIGNALS

Frank S. Gutleber, Wayne, and Irving A. Krause, Nutley, N.J., assignors to International Telephone and Telegraph Corporation, Nutley, N.J., a corporation of Delaware Filed Nov. 30, 1966, Ser. No. 598,016
Int. Cl. H04l 27/24
U.S. Cl. 178—67 10 Claims

ABSTRACT OF THE DISCLOSURE

In a PSK synchronizing system, locally generated signals synchronize a received carrier. Cross correlation and phase lock loop techniques are used to provide an output phase characteristic independent of the information rate.

This invention relates to synchronizing systems and more particularly to a system for synchronizing locally generated signals to a received carrier having changing phase information, such as a phase shift keyed (PSK) information signal.

Present synchronizing systems utilized with PSK systems utilize either a delay line multiplier techinque (autocorrelation), or utilize frequency doubling with a nonlinear element, such as an unsymmetrical clipper. In both of these systems, the threshold level is restricted due to added signal components which degrade the operating signal to noise ratio at low input signal to noise levels. For a diode detector (unsymmetrical clipper) the output signal to noise ratio is very closely equal to the square of the input signal to noise ratio at low input signal to noise level. Also, the auto-correlation system degrades the signal to noise ratio at low input signal to noise ratios.

Therefore, an object of this invention is the provision of a synchronizing system for PSK signals which do not degrade signal to noise ratios regardless of how low these ratios may be.

A true multiplier (cross correlation process) offers no degradation of the signal to noise ratio no matter how low the input signal to noise ratio is.

Therefore, another object of this invention is to provide a synchronizing system for a PSK system utilizing cross correlation techniques and phase lock loop techniques providing an output phase characteristic independent of the information rate to facilitate integrating of a very large quantity of information code bits.

A feature of this invention is the provision of a system to synchronize locally generated signals to a received carrier having changing phase information comprising a source of PSK information signal having a carrier including a first phase condition and a second condition in a 90° phase relation with respect to the first phase condition, first means to generate a first local signal and a second local signal having a predetermined phase relation with respect to the first local signal, a first multiplier coupled to the source and the first means responsive to the information signal and the first local signal, a second multiplier coupled to the source and the first means responsive to the information signal and the second local signal, second means coupled to the first and second multipliers to combine the resultant output signals therefrom, third means coupled to the second means to produce from the combined output signal a control signal proportional to the synchronous relation between the information signal and the first and second local signals, and fourth means to couple the control signal to the first means for control thereof to synchronize the first and second local signals to the information signal.

Another feature of this invention includes a means coupled to the above mentioned second means to demodulate the information signal for recovery of the first and second phase conditions when synchronization is achieved.

The above mentioned and other features and objects of this invention will become more apparent by reference to the following description taken in conjunction with the accompanying drawings, in which.

Figures 1, 2, 4:
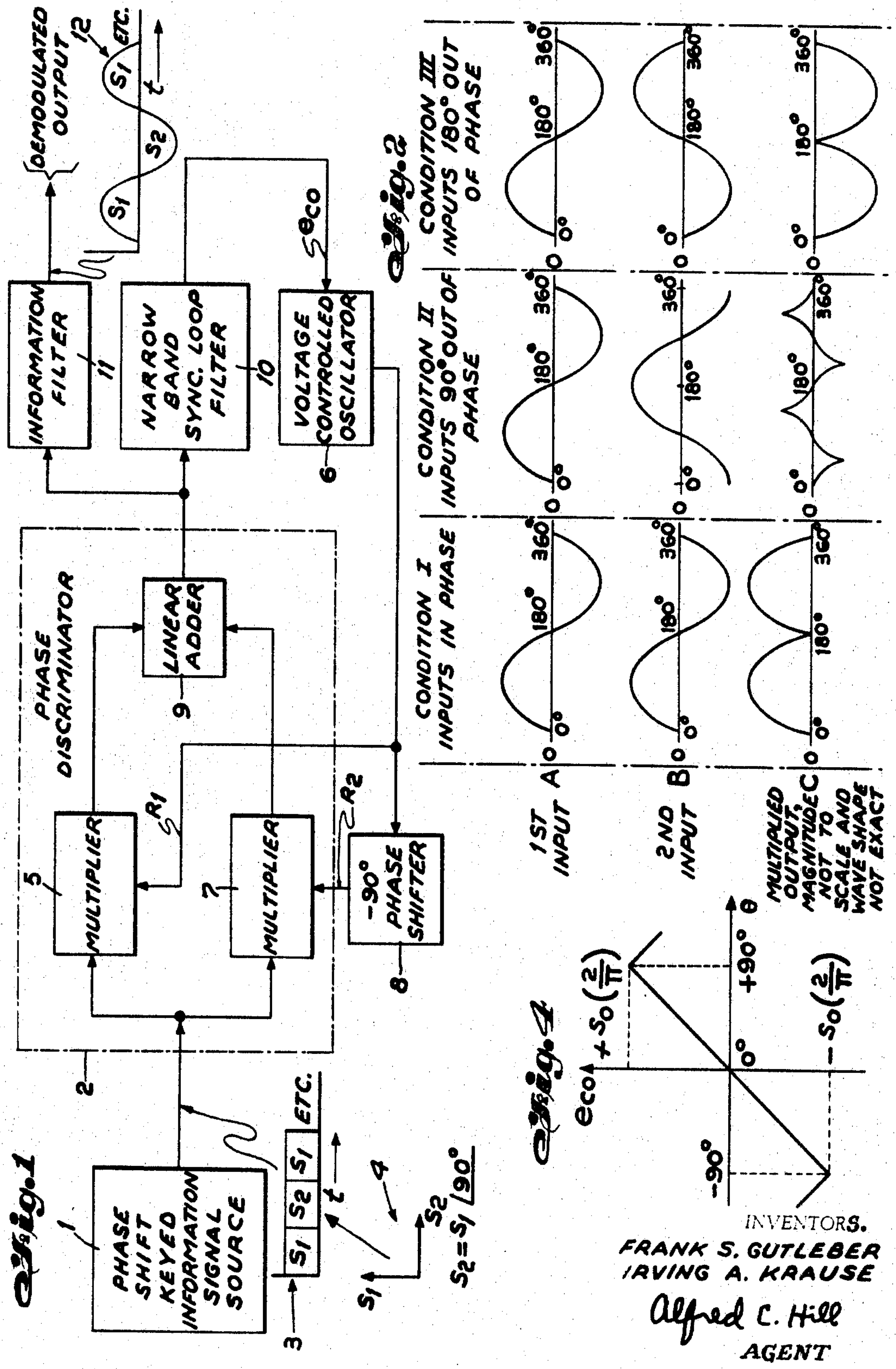
FIG. 1 is a block diagram of the synchronizing system in accordance with the principles of this invention.
FIG. 2 illustrates a series of curves for three different conditions to indicate the resultant output of a multiplier as employed in FIG. 1.
FIG. 4 is a graphical representation of the characteristic of the phase discriminator and synchronizing loop filter of the system of FIG. 1.

Referring to FIG. 1, the PSK information signal is coupled from source 1 to phase discriminator 2. The PSK information signal includes two phase conditions, identified as $S_1$ and $S_2$, which are applied in time sequence to phase discriminator 2, as illustrated in curve 3. It is required for the operation of the synchronizing system of this invention that phase condition $S_2$ be disposed in a 90° phase relationship with phase condition $S_1$, as illustrated in vector diagram 4.

Phase discriminator 2 includes multiplier 5 coupled to coupled to source 1 and also to the output of voltage controlled oscillator 6 providing reference signal $R_1$. Multiplier 7 is also coupled to source 1 and has applied thereto a reference signal $R_2$ provided by phase shifter 8 coupled to oscillator 6. Reference signal $R_2$ in the illustrated example has a minimum 90° phase relation with respect to reference signal $R_1$.

Before proceeding, it should be observed that the system will operate if phase condition $S_2$ has a minimum 90° phase relationship with respect to phase condition $S_1$ and reference signal $R_2$ has a plus 90° phase relationship with respect to reference signal $R_1$.

Continuing with the description of phase discriminator 2, the output of multipliers 5 and 7 are coupled to linear adder 9 to produce an output for phase discriminator 2 which will enable synchronization and extraction of the phase condition from the information signal.

To provide synchronization, narrow band filter 10 is coupled to the output of adder 9 to produce a control signal which is proportional to the synchronous relation between the phase conditions of the information signal and the two locally generated reference signals. The control signal $e_{co}$ is coupled from filter 10 to oscillator 6 to adjust the phase of reference signals $R_1$ and $R_2$ with respect to phase conditions $S_1$ and $S_2$ to establish the desired synchronization.

When synchronization is achieved, information filter 11 having a wider band than filter 10 is coupled to the output of linear adder 9 to demodulate the information signal and provide the phase conditions as illustrated in curve 12.

Figure 3:
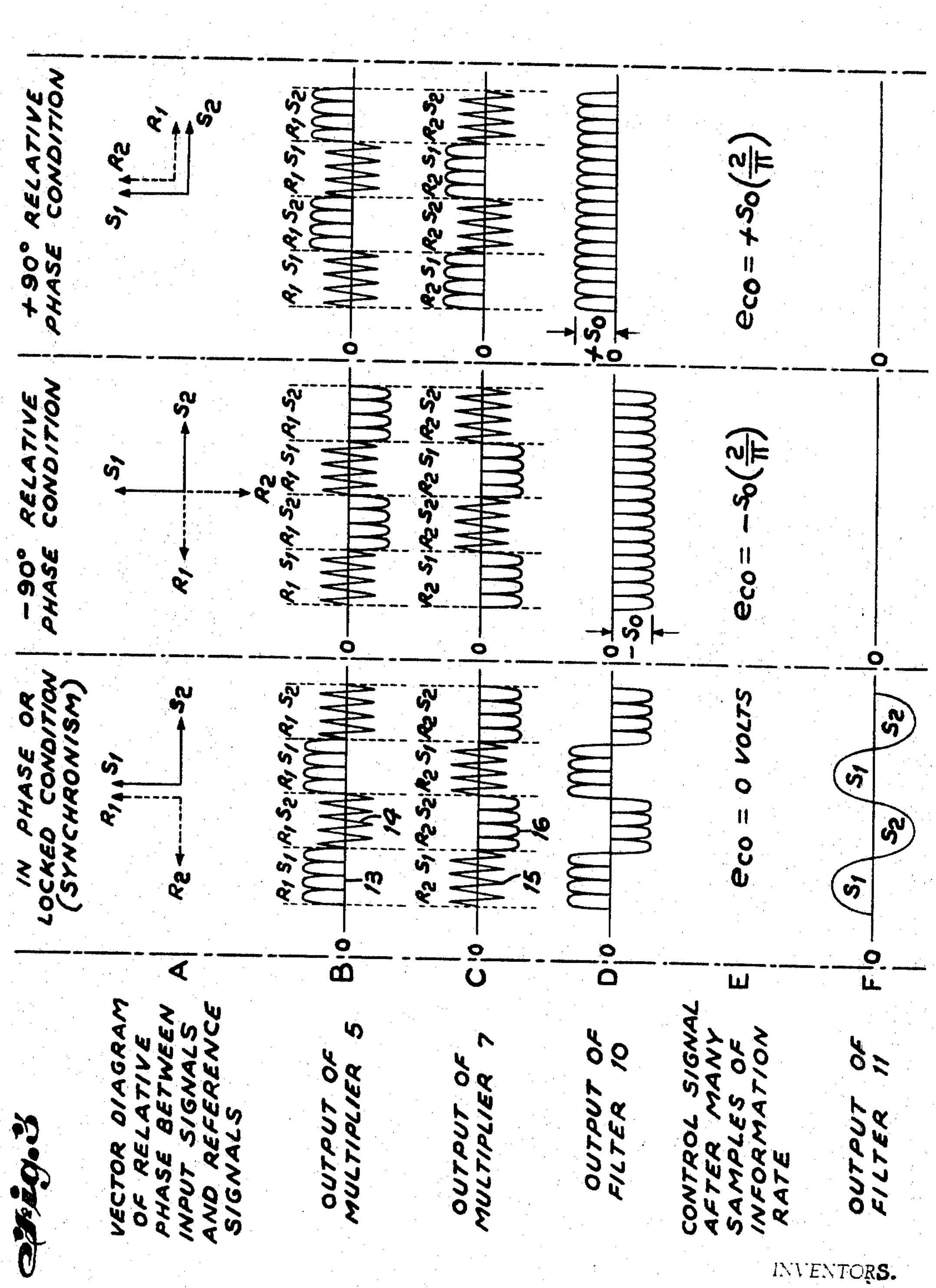
FIG. 3 illustrates a series of curve for three phase conditions useful in illustrating the operation of the system of FIG. 1.

Before proceeding with the description of the operation of FIG. 1 in connection with FIG. 3, let us consider the operation of a multiplier at various conditions of relative phase between the input signal as indicated in FIG. 2. Condition I illustrates the operation of a multiplier where the inputs are in phase, as illustrated in curves A and B. When the instantaneous values of the inputs, as illustrated in curves A and B, are algebraically multiplied, there is generated the multiplied output as illustrated in curve C. It should be noted that curve C is not to scale as far as magnitude is concerned and thus, the wave shape is not exact. Actually, the peak magnitudes of the waveform in curve C would be sixteen if the peak magnitudes of the waves in curves A and B were four, thus providing a waveform having much steeper trailing and leading edges. Condition II illustrates the result of multiplying two input signals that are 90° out of phase, as illustrated in curves A and B. The resultant output illustrated in curve C (which again is not to scale as far as magnitude is concerned but does have substantially the waveform illustrated). It will be noted that in each 180° there are symmetrical negative and positive waveforms. Conditions III illustrates the operation of a multiplier when the two inputs are 180° out of phase, as illustrated in curves A and B. The resultant output, illustrated in curve C, is identical to that shown in condition I but 180° out of phase therewith.

Keeping in mind the explanation of the result of multiplying two inputs with different phase relations as set forth in the description of FIG. 2, we will now turn to FIG. 3 and describe the operation of FIG. 1. FIG. 3 illustrates again three conditions with these conditions being vectorally illustrated in curve A.

The first condition is the inphase or lock condition which establishes the desired synchronism. The output of multiplier 5 is illustrated in curve B where the product of $R_1S_1$ is that illustrated at 13 while the output of multiplier 5 for the product $R_1S_2$ is that illustrated at 14. The output of multiplier 7 for the product $R_2S_1$ is illustrated at 15 in curve C and the product $R_2S_2$ is illustrated at 16 in curve C. When the outputs of curves B and C are linearly added in adder 9 and integrated in filter 10, there is produced the waveform illustrated in curve D. The reason that portion 13 and portion 16 are present in curve D and the waveforms of portion 14 and 15 are not in curve D is that, over a period of 180°, the waveform portions 14 and 15 algebraically cancels themselves in adder 9 due to the symmetric positive and negative portion in this 180° period. The resultant control signal after many samples of information rate for this synchronous condition is zero due to the positive and negative symmetry of the output of filter 10. Information filter 11 coupled to the output of adder 9 produces the waveform shown in curve F which illustrates that the phase conditions are distinct one from the other due to their positive and negative relationship. This will enable recovery of the PSK information.

The minus 90° relative phase condition of phase conditions $S_1$ and $S_2$ with respect to reference signals $R_1$ and $R_2$ is illustrated in curve A. The resultant products of $R_1$ with $S_1$ and $S_2$ in multiplier 5 is illustrated in curve B while the resultant products of $R_2$ and $S_1$ and $S_2$ in multiplier 7 are illustrated in curve C. When these two waveforms are linearly added, there results the waveform at the output of filter 10 illustrated in curve D. After many samples of information rate, the control signal has the value illustrated numerically opposite the label E. No output will appear at the output of filter 11.

The plus 90° relative phase condition between the phase conditions $S_1$ and $S_2$ and the reference signals $R_1$ and $R_2$ is illustrated in curve A. The output of multiplier 5 is illustrated in curve B and the output of multiplier 7 is illustrated in curve C. When the waveforms of curves B and C are linearly added and integrated in filter 10, there results the waveform illustrated in curve D which after many samples of information rate provide the control signal numerically indicated opposite the label E.

The overall discriminator characteristic resulting from phase discriminator 2 and filter 10 is illustrated in FIG. 4. This characteristic curve illustrates that a D.C. control voltage produced by the system of this invention is linearly related to the relative phase between the two phase conditions of the information signal (present at different times) and the two reference signals $R_1$ and $R_2$. This facilitates extreme narrow banding of the closed loop for synchronization resulting in an acquisition threshold level far below the information threshold level. The system of FIG. 1 is a true cross correlation detector and is capable of synchronizing to the input carrier frequency when filter 10 is much more narrow band than information filter 11 providing the desirable feature of automatically maintaining the acquisition threshold much lower than the information threshold. It is also worthwhile noting that the synchronizing loop utilizes the entire signal energy content and realizes this without adding any degradation of the signal to noise ratio. Also, the demodulated output from filter 11 is automatically providing upon synchronization of the locally generated signal to the phase conditions of the received carrier.

While I have described above the principles of my invention in connection with specific apparatus it is to be clearly understood that this description is made only by way of example and not as a limitation to the scope of my invention as set forth in the objects thereof and in the accompanying claims.

We claim:

1. A system to synchronize locally generated signals to a received carrier having changing phase information comprising:
- a source of phase shift keyed information signal having a carrier including a first phase condition and a second phase condition in a 90° phase relation with respect to said first phase condition;
- first means to generate a first local signal and a second local signal having a predetermined phase relation with respect to said first local signal;
- a first multiplier coupled to said source and said first means responsive to said information signal and said first local signal;
- a second multiplier coupled to said source and said first means responsive to said information signal and said second local signal;
- second means coupled to said first and second multipliers to combine the resultant output signals therefrom;
- third means coupled to said second means to produce from said combined output signals a control signal proportional to the synchronous relation between said information signal and said first and second local signals; and
- fourth means to couple said control signal to said first means for control thereof to synchronize said first and second local signals to said information signal.

2. A system according to claim 1, wherein
- said second phase condition is shifted 90° in a given direction from said first phase condition; and
- said second local signal is shifted 90° in a direction opposite said given direction from said first local signal.

3. A system according to claim 1, wherein
- said first means includes
  - a voltage controlled oscillator coupled to said first multiplier to generate said first local signal, and
  - a phase shift means coupled between said oscillator and said second multiplier to generate said second local signal shifted 90° in a given direction from said first local signal.

4. A system according to claim 3, wherein
- said second phase condition is shifted 90° in a direction opposite said given direction from said first phase condition.

5. A system according to claim 3, wherein
- said third means includes
  - a narrow band filter to integrate the output of said second means.

6. A system according to claim 5, wherein
- said fourth means includes
  - a conductor coupling said control signal from the output of said narrow band filter to said voltage controlled oscillator.

7. A system according to claim 1, wherein
said second means includes
a linear adder.

8. A system according to claim 1, further including
means coupled to the output of said second means to demodulate said information signal for recovery of said first and second phase condition when synchronization is achieved.

9. A system according to claim 8, wherein
said second phase condition is shifted 90° in a given direction from said first phase condition; and
said second local signal is shifted 90° in a direction opposite said given direction from said first local signal.

10. A system according to claim 9, wherein
said first means includes
a voltage controlled oscillator coupled to said first multiplier to generate said first local signal, and
a phase shift means coupled between said oscillator and said second multiplier to generate said second local signal shifted 90° in said opposite direction from said first local signal;
said second means includes a linear adder;
said third means includes
a narrow band filter coupled to said adder to integrate said combined output signal to produce said control signal; and
said fourth means includes
a conductor coupled between the output of said filter and said oscillator to couple said control signal to said oscillator.

References Cited

UNITED STATES PATENTS

| | | | |
|---|---|---|---|
| 3,158,864 | 11/1964 | Lehan | 179—15 |
| 3,349,182 | 10/1967 | Sukehiro Ito et al. | 178—67 XR |
| 3,423,529 | 1/1969 | O'Neill | 325—320 XR |
| 3,430,143 | 2/1969 | Walker et al. | 178—67 XR |

RICHARD MURRAY, Primary Examiner

CARL R. VONHELLENS, Assistant Examiner

U.S. Cl. X.R.

325—320